W. P. SHARP.
CURTAIN HOLDER FOR AUTOMOBILE TOPS.
APPLICATION FILED OCT. 27, 1919.
1,340,799.
Patented May 18, 1920.
2 SHEETS—SHEET 1.
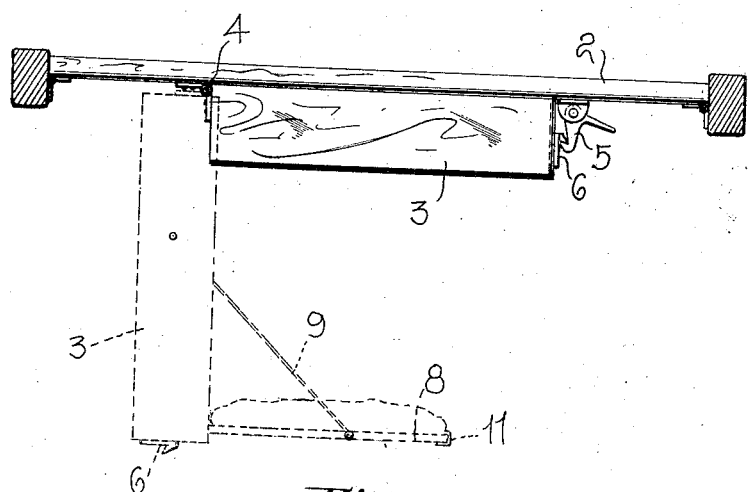
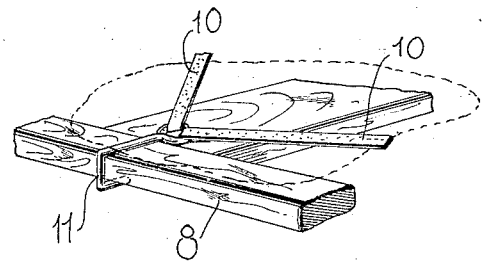
Inventor:
W. P. Sharp
Franklin H. Hough
By Attorney:

W. P. SHARP.
CURTAIN HOLDER FOR AUTOMOBILE TOPS.
APPLICATION FILED OCT. 27, 1919.
1,340,799.
Patented May 18, 1920.
2 SHEETS—SHEET 2.
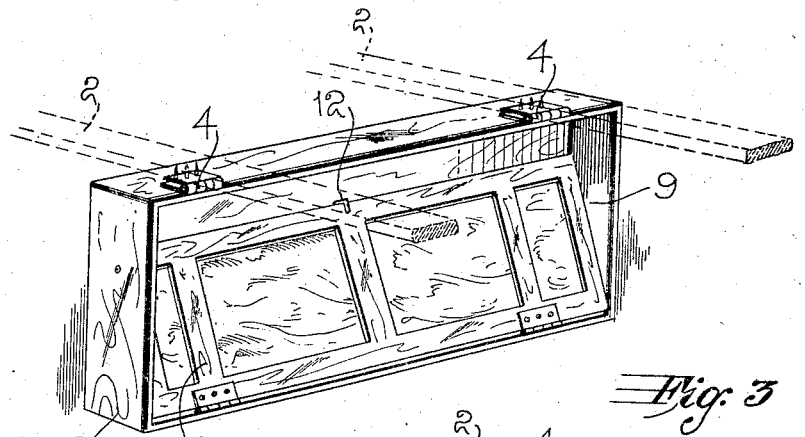
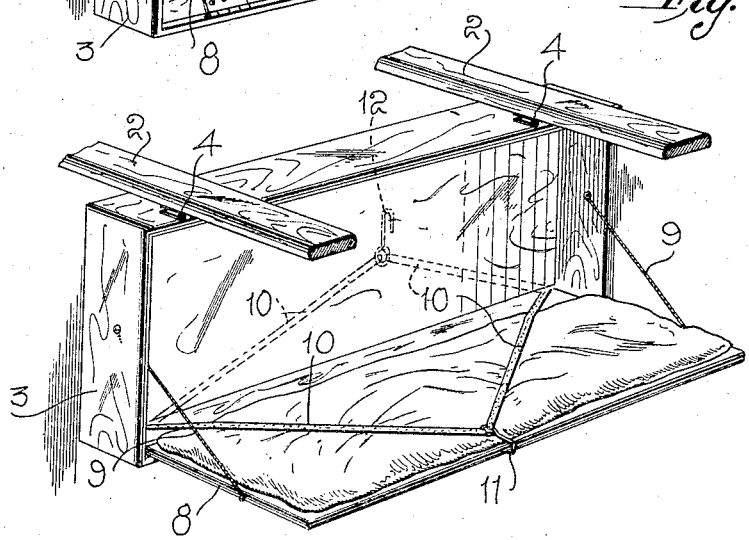
Inventor:
W. P. Sharp
Franklin H. Hough
By Attorney:

UNITED STATES PATENT OFFICE.

WILLIAM PRESCOTT SHARP, OF COLUMBUS, OHIO.

CURTAIN-HOLDER FOR AUTOMOBILE-TOPS.

1,340,799.  Specification of Letters Patent.  Patented May 18, 1920.

Application filed April 7, 1919. Serial No. 288,016.

*To all whom it may concern:*

Be it known that I, WILLIAM PRESCOTT SHARP, a citizen of the United States, residing at Columbus, in the county of Franklin and State of Ohio, have invented certain new and useful Improvements in Curtain-Holders for Automobile-Tops; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in a device or attachment for holding curtains to tops of automobiles, and consists of a simple and efficient means whereby curtains may be held to the bows of an automobile in a receptacle which is hinged thereto.

My invention consists of a simple combination and arrangement of parts which will be hereinafter fully described, shown in the accompanying drawings and then specifically defined in the appended claims.

My invention is illustrated in the accompanying drawings which, with the numerals of reference marked thereon, form a part of this application, and in which:

Figure 1 is a side elevation showing the application of my invention to the top of an automobile.

Fig. 2 is a perspective view of the box, or receptacle, in the position it occupies when swung downward, the rack being shown in closed position.

Fig. 3 is a view similar to Fig. 2, but showing the rack swung downward, or in open position.

Fig. 4 is a fragmentary detail view of the rack and the means for securing a garment thereto.

Reference now being had to the details of the drawings by numerals:

1 designates the bows of the top of an automobile and 2 are strips hinged at their ends to said bows parallel to each other. The receptacle 3 which is adapted to contain the curtains is hinged at 4 to said strips 2 and latches 5, fastented to said strips 2 are adapted to engage keepers 6 fastened to the free swinging edge of the receptacle so that when the latter is swung to the position shown in full lines in Fig. 1 the latches will automatically engage the keepers and hold the receptacle up against the under surface of strips 2.

A rack designated by numeral 8 is pivoted at one edge of the inner side of the receptacle, and cords 9 are fastened to the ends of the rack and the other ends to the end of the receptacle, and tend to limit the outer swinging movement of the rack. Elastic straps 10 are fastened within the receptacle and 11 is a hook engaging said straps and hooking over the edge of the rack, the purpose of said straps being to hold the automobile curtain against the rack as shown.

When device is not in use, it will assume the position shown in Fig. 1 of the drawings, and when it is desired to use the curtains, the person within the automobile may efficiently release the latches and permit the receptacle to swing down, after which the curtains may be removed from the rack and receptacle again closed.

What I claim to be new is:

1. A receptacle for holding curtains on automobile tops, consisting of a receptacle, a rack hinged thereto, elastic elements attached at one end to said receptacle, interiorly thereof, and a hook carried by said elements and engageable with the free edge of said rack, to tension said elements.

2. A receptacle for holding curtains on automobile tops, consisting of a receptacle, a rack hinged thereto, elastic elements oppositely inclined and united at one end thereof, and attached at their other end to said receptacle, interiorly thereof, and a hook carried by the connected end of said elements and engageable with the free edge of said rack, to tension said elements.

In testimony whereof I hereunto affix my signature.

WILLIAM PRESCOTT SHARP.